United States Patent Office 3,641,154
Patented Feb. 8, 1972

3,641,154
PROCESS OF SYNTHESIZING N-MONOALKYL PICRAMIC ACIDS
John Frank Corbett and Geoffrey Wilfred Amery, Reading, England, assignors to The Gillette Company, Boston, Mass.
No Drawing. Filed Jan. 23, 1969, Ser. No. 793,585
Claims priority, application Great Britain, July 10, 1968, 32,963/68
Int. Cl. C07c 91/44
U.S. Cl. 260—571
5 Claims

ABSTRACT OF THE DISCLOSURE

A process for the preparation of N-monoalkyl-isopicramic acids in which the N-alkyl group contains up to 6 carbon atoms, which comprises nitrating an N-monoalkyl-p-aminophenol, in which the N-alkyl group contains up to 6 carbon atoms and in which the amino group remains free from acetylation with nitric acid in the presence of sulfuric acid at a temperature from —20° to +30° C. to introduce two nitro groups into said aminophenol.

This invention is concerned with a process for the preparation of N-monoalkyl-isopicramic acids in which the N-alkyl group contains up to 6 carbon atoms.

N-methyl-isopicramic acid is a known dye which is particularly useful as a dye for hair and other keratinous materials. Hitherto this compound has always been prepared from N-methyl-p-aminophenol by a multi-stage process comprising (i) protection of the methylamino group by acetylation, (ii) dinitration and (iii) hydrolysis of the acetyl group to liberate the desired compound; this process may be represented as follows:

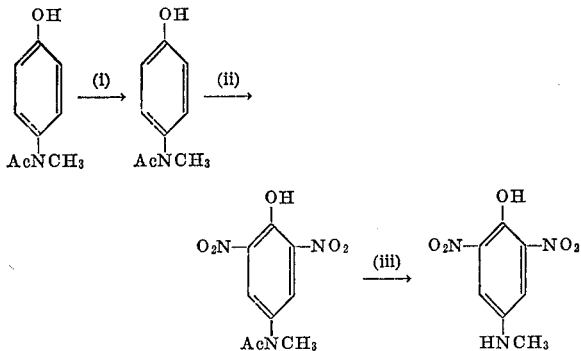

in which Ac represents an acetyl group.

We have now surprisingly found that protection by acetylation of the methylamino group of the starting material, N-methyl-p-aminophenol, is not necessary and that good yields of the desired dinitrated product are obtained from the unprotected starting material provided that the nitration reaction is carried out at a temperature below 30° C., and preferably below 5° C. The process using an unprotected starting material can equally be applied to N-monoalkyl-p-aminophenols in which the N-alkyl group contains up to 6 carbon atoms.

According to the present invention, therefore, we provide a process for the preparation of N-monoalkyl-isopicramic acids in which the N-alkyl group contains up to 6 carbon atoms, which comprises nitrating an N-monoalkyl-p-aminophenol, in which the N-alkyl group contains up to 6 carbon atoms, with nitric acid in the presence of sulfuric acid at a temperature of from —20° to +30° C. so as to introduce two nitro groups into the starting material.

The N-alkyl group in the starting material and in the product of this process may be linear, branched or cyclic, that is it may be a cycloalkyl group such as cyclohexyl as well as methyl, ethyl, n-propyl, isopropyl, n-butyl, tert.-butyl, n-pentyl, n-hexyl, etc.

Optimum yields are obtained when the process is carried out at a temperature of from —10° to +5° C. It is normally preferred to use from 2.2 to 2.5 moles of nitric acid per mole of aminophenol starting material.

There is nothing critical about the concentration of the concentrated sulfuric acid used in the process; any of the concentrated acids usually available having a concentration from about 93 to about 98% may be used, approximately 98% acid being preferred. The relative proportion of nitric and sulfuric acid in the nitrating mixture is also not critical but may vary over a wide range as is well known in the art. For example, weight ratios of nitric acid to sulfuric acid as low as 1:30 or even lower may be used, and up to 1:3 or more. If desired, the nitric acid may be first mixed with a portion of the sulfuric acid, then stirred into a solution of the N-monoalkyl-p-aminophenol in the remaining sulfuric acid in order to facilitate cooling of the reaction mixture, but it is also possible to stir the pure nitric acid directly into a solution of the N-monoalkyl-p-aminophenol in concentrated sulfuric acid.

N-monoalkyl-isopicramic acids in which the alkyl group contains from 3 to 6 carbon atoms, that is compounds of the formula:

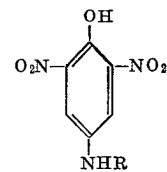

in which R is a linear, branched or cyclic alkyl group containing from 3 to 6 carbon atoms, are novel compounds resulting from the process of the present invention. These compounds are useful as dyes, particularly for hair and other keratinous materials.

In order that the invention may be more fully understood, the following examples are given by way of illustration only:

EXAMPLE 1

There was dissolved in 25 ml. of concentrated sulfuric acid 10 g. of "Metol" (N-methyl-p-aminophenol sulphate) and the solution was cooled to 0° C. in an ice-salt bath. A cooled mixture of 9 ml. of nitric acid (s.g. 1.42) and 15 ml. of concentrated sulfuric acid was added at such a rate that the temperature did not rise above 5° C. On completion of the addition, the mixture was allowed to warm to room temperature and then poured on to ice. The product was precipitated by the addition of aqueous sodium hydroxide until the pH rose to 4. The solid was filtered off and washed with water until free from sulphate and dried in an oven. The yield was 11.7 g. (94.5%) of N-methyl-isopicramic acid, M.P. 151–3° C. Recrystallization from ethanol gave a pure sample, M.P. 156° C. Analysis of the pure sample showed that it contained 38.9% carbon and 2.7% hydrogen; the theoretical amounts calculated for the compound are 39.5% carbon and 3.3% hydrogen.

EXAMPLE 2

There was dissolved in 15 ml. concentrated sulfuric acid 0.9 g. of N-isopropyl-p-aminophenol (the preparation of which is described in Chemical Abstracts, 45, 1332c) and the solution was cooled to 0° C. in an ice bath. A mixture of 1 ml. nitric acid (s.g. 1.42) and 5 ml. concentrated sulfuric acid was added portionwise so as to keep the temperature between 0 and 5° C. When addition was complete the reaction mixture was allowed to stand at room temperature for 30 minutes and was then poured on to crushed ice. The product was obtained by adding sodium hydroxide solution, at 20–30° C., until the pH was about 4. The precipitated product was filtered off and washed with 2% aqueous acetic acid and then dried in a vacuum oven. The yield was 1.2 g. (83%) of N-isopropyl-isopicramic acid, M.P. 84–5° C. Recrystallization from aqueous ethanol gave a pure sample, M.P. 88–9° C. Analysis of the pure sample showed that it contained 45.3% carbon and 4.6% hydrogen; the theoretical amounts calculated for the compound are 44.8% carbon and 4.6% hydrogen.

Although specific embodiments of the invention have been described herein, it is not intended to limit the invention solely thereto but to include all of the variations and modifications which suggest themselves to one skilled in the art within the spirit and scope of the appended claims.

What is claimed is:

1. A process for the preparation of N-monoalkyl-isopicramic acid in which the N-alkyl group contains up to 6 carbon atoms, which comprises reacting an N-monoalkyl-p-aminophenol free from acetylation, in which the N-alkyl group contains up to 6 carbon atoms, directly with nitric acid in the presence of sulfuric acid at a temperature from −20° to +30° C. to introduce two nitro groups into said aminophenol.

2. A process according to claim 1, in which nitration is carried out at a temperature of from −10° to +5° C.

3. A process according to claim 1, in which from 2.2 to 2.5 moles of nitric acid are used per mole of aminophenol.

4. A process as claimed in claim 1 in which said N-alkyl group is N-methyl.

5. A process according to claim 2, in which from 2.2 to 2.5 moles of nitric acid are used per mole of aminophenol.

References Cited

UNITED STATES PATENTS

| | | | |
|---|---|---|---|
| 3,117,911 | 1/1964 | Kalopissis et al. | 260—577 X |
| 3,134,721 | 5/1964 | Seemuller | 167—88 |
| 3,278,604 | 10/1966 | Hoffman et al. | 260—688 |

OTHER REFERENCES

Noller, Chemistry of Organic Compounds, 3rd. ed., W. B. Saunders Co.; Philadelphia, 1965, pp. 526 and 527.

CHARLES B. PARKER, Primary Examiner

C. F. WARREN, Assistant Examiner

U.S. Cl. X.R.

260—574, 688